United States Patent
Basumatary et al.

(10) Patent No.: US 11,120,208 B1
(45) Date of Patent: Sep. 14, 2021

(54) ONE CLICK ELECTRONIC SIGNATURE

(71) Applicant: ADP, LLC, Roseland, NJ (US)

(72) Inventors: Deepak Basumatary, Hyderabad (IN); Prasad Rasapally, Pune (IN); Kajal Singhal, Pune (IN); Scott Francis, Atlanta, GA (US); Narendra Verma, Alpharetta, GA (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/880,400

(22) Filed: May 21, 2020

(51) Int. Cl.
*G06F 40/174* (2020.01)
*G06F 3/0488* (2013.01)
*G06T 11/20* (2006.01)
*G06K 9/00* (2006.01)
*G06F 3/041* (2006.01)
*G06F 17/00* (2019.01)

(52) U.S. Cl.
CPC ........ *G06F 40/174* (2020.01); *G06F 3/04883* (2013.01); *G06T 11/203* (2013.01); *G06F 3/0416* (2013.01); *G06K 9/00154* (2013.01); *G06K 9/00442* (2013.01)

(58) Field of Classification Search
CPC .. G06F 40/174; G06F 3/04883; G06F 3/0416; G06T 11/203; G06K 9/00154; G06K 9/00442
See application file for complete search history.

(56) References Cited

U.S. PATENT DOCUMENTS

| | | | | |
|---|---|---|---|---|
| 6,631,200 | B1* | 10/2003 | Savoray | G06F 21/64 382/119 |
| 9,349,202 | B1* | 5/2016 | Manohar | G06K 9/00463 |
| 2014/0149281 | A1* | 5/2014 | Shvarts | G06Q 30/06 705/39 |
| 2015/0348297 | A1* | 12/2015 | Kaasila | G06F 16/51 345/467 |
| 2018/0143948 | A1* | 5/2018 | Bartkiewicz | H04L 51/10 |
| 2019/0087639 | A1* | 3/2019 | Crane | G06K 9/00442 |
| 2020/0153635 | A1* | 5/2020 | Serres | H04L 9/32 |
| 2021/0034230 | A1* | 2/2021 | Zank | G06F 3/04842 |

* cited by examiner

*Primary Examiner* — Quoc A Tran
(74) *Attorney, Agent, or Firm* — Yee & Associates, P.C.

(57) ABSTRACT

A method for electronic signature is provided. The method comprises capturing a user name through an interface and calculating a font size for an electronic signature of the user name based on the number of characters in the user name. The electronic signature of the user name is drawn using the font and calculated font size, and a determination is made if the electronic signature fits within a specified field of an electronic form. If the electronic signature fits within the specified field the electronic signature is submitted in the electronic form.

20 Claims, 9 Drawing Sheets

? ABOUT

First Name * — 504
Pat

Last Name * — 506
Smith

Street Address *
345 Winward

Zip Code *
30001

Social Security Number
**********

Why we need this

Are you under age 40? *
YES  NO

502

Have you previously worked for OrbisSingleFlow? *
YES  NO

Do you know your prospective worksite location? *
YES  NO

Please select your answers to the following questions? *
EDIT SELECTIONS

You made the following selections:

SSI Recipient

508 — SUBMIT

HELP   PRIVACY   LEGAL

?  ABOUT | 🔒 SECURED BY ADP

Pat | Smith

Street Address * | Zip Code *
111 | 30001

Signature required to complete questionnaire

Under penalties of perjury, I declare that I gave the previous information to the employer on or before the day I was offered a job, and it is, to the best of my knowledge, true, correct, and complete.

702 — *Pat Smith*

The signature above indicates you accept the above statement and the signature will be used to electronically sign the Form 8850 and any additional forms as required. View Completed Forms

602

704 — SUBMIT

E-SIGN NOW

SUBMIT

HELP   PRIVACY   LEGAL

ONE CLICK ELECTRONIC SIGNATURE

BACKGROUND INFORMATION

1. Field

The present disclosure relates generally to an improved computing system, and more specifically to an improved electronic signature system that enables a single-click electronic signature that is legible across different platforms.

2. Background

Many official forms require a user signature legally affirming the validity and veracity of information entered in the form. Examples of such forms include tax forms, banking forms, financial transactions, employment applications or benefits forms, etc.

As such forms move to electronic and online formats, signatures must also be provided electronically. Many systems allow users to draw a signature in an interface using a mouse or touch screen device such as a stylus or even with the user's finger. Depending on the size of the screen and interface, manually drawing a legible signature might be difficult.

SUMMARY

An illustrative embodiment provides a computer-implemented method for electronic signature. The method comprises using a number of processors to perform the steps of: capturing a user name through an interface; calculating a font size for an electronic signature of the user name based on the number of characters in the user name; drawing the electronic signature of the user name using the calculated font size; determining if the electronic signature fits within a specified field of an electronic form; and submitting the electronic signature in the electronic form if the electronic signature fits within the specified field.

Another illustrative embodiment provides a system for electronic signature. The system comprises a storage device configured to store program instructions and one or more processors operably connected to the storage device and configured to execute the program instructions to cause the system to: capture a user name through an interface; calculate a font size for an electronic signature of the user name based on the number of characters in the user name; draw the electronic signature of the user name using the calculated font size; determine if the electronic signature fits within a specified field of an electronic form; and submit the electronic signature in the electronic form if the electronic signature fits within the specified field.

Yet another illustrative embodiment provides a computer program product for electronic signature. The computer program product comprises a computer readable storage media having program instructions stored thereon to perform the steps of: capturing a user name through an interface; calculating a font size for an electronic signature of the user name based on the number of characters in the user name; drawing the electronic signature of the user name using the calculated font size; determining if the electronic signature fits within a specified field of an electronic form; and submitting the electronic signature in the electronic form if the electronic signature fits within the specified field.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that electronic signature systems comprising manual drawing of the signature can be extremely difficult to use on mobile devices with small screens. It can often be quite time consuming to draw a signature with a mouse, leading to an increase in screening time.

The illustrative embodiments also recognize and take into account that applicants often submit manually drawn signatures that are not legible, which can result in denial by state authorities or other parties. Illegible signatures can result in more follow-up processing to obtain a valid signature. In addition to increased administrative burden, the additional time needed to obtain the valid signature could result in deadlines being missed.

Figure 1:
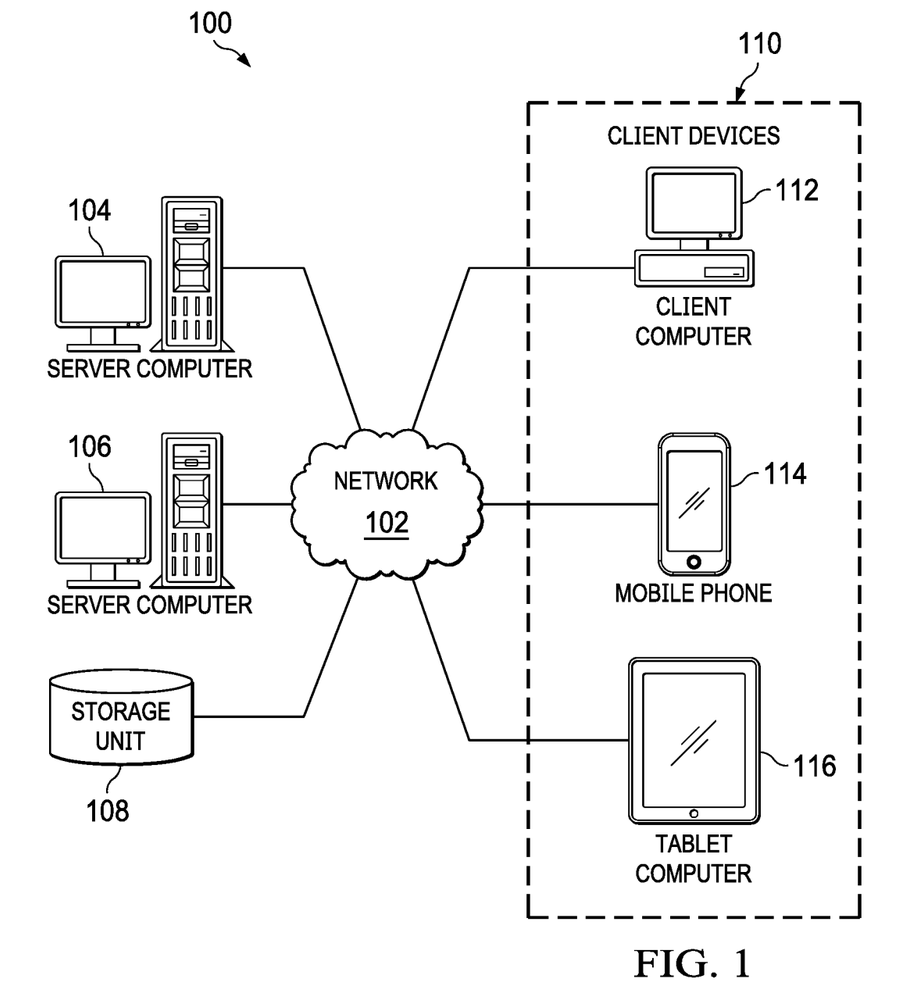
FIG. 1 is a pictorial representation of a network of data processing systems in which illustrative embodiments may be implemented.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or mobile devices. As depicted, client devices 110 include client computer 112, mobile phone 114, tablet computer 116. Other client devices might include laptop/notebook computers and smart classes.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 might include additional server computers, client computers, and other devices not shown. Client devices 110 might connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 might also be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Illustrative embodiments can be implemented in network data processing system 100. For example, mobile phone 114 and tablet computer 116 might include an interface for mobile learning content. Mobile learning course content can be located on a server such as server computer 104 or server computer 106 or distributed across multiple serves. Communication of course content and mobile interface inputs can be communicated over network 102 with a TCP/IP protocol.

Figure 2:
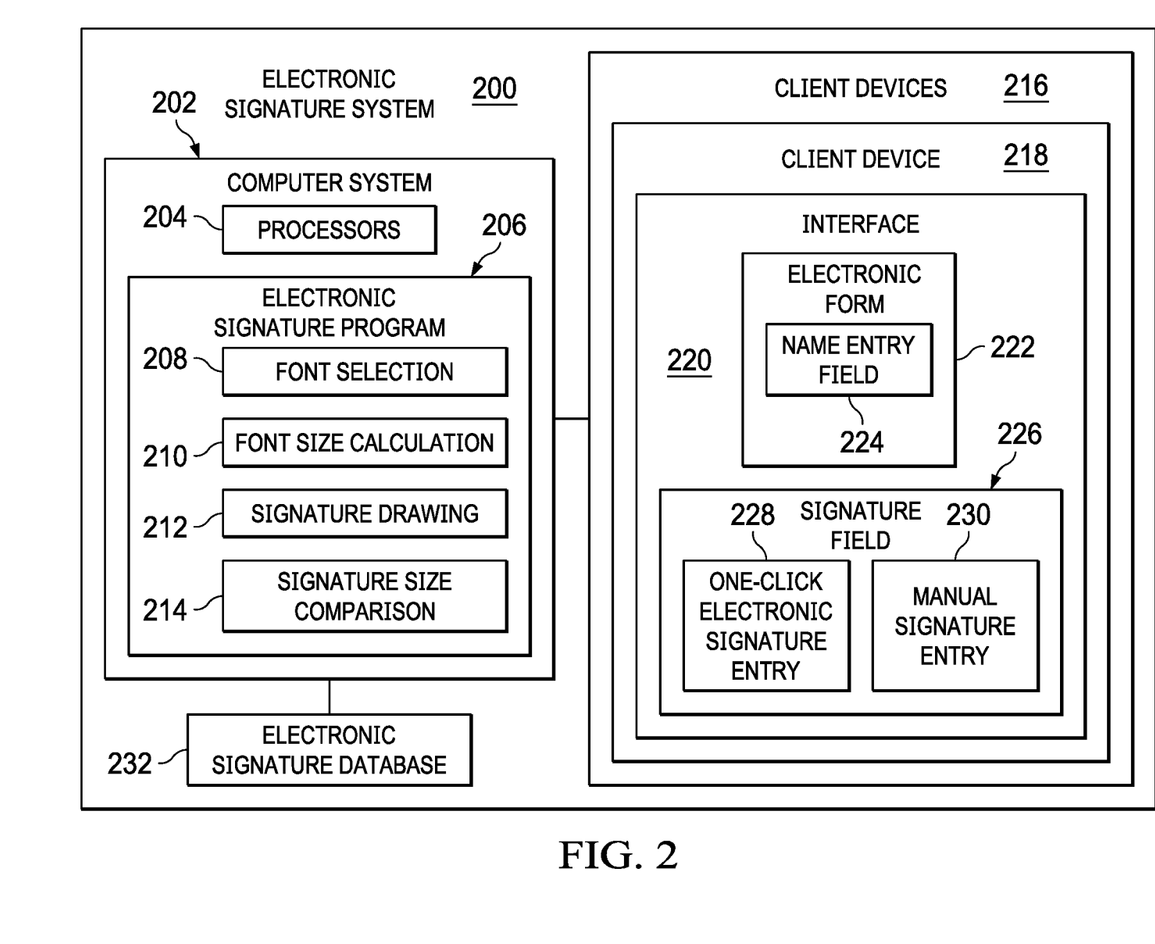
FIG. 2 depicts a block diagram of an electronic signature system in accordance with an illustrative embodiment.

Turning to FIG. 2, a block diagram of an electronic signature system is depicted in accordance with an illustrative embodiment. Electronic signature system 200 might be implemented in network data processing system 100 shown in FIG. 1. Electronic signature system 200 comprises computer system 202 and a number of client devices 216.

Computer system 202 comprise an electronic signature program 206 and a number of processors 204 configured to execute electronic signature program. Electronic signature program 206 comprises font selection 208 for selecting a font family and style for an electronic signature. Font size calculation 210 determines the size of the selected font to use for the electronic signature depending on the length of the name in question. Signature drawing 212 creates an electronic signature according to the selected font and font size. Signature size comparison 214 compares the size of the electronic signature to the signature field 226 in an interface 220 to determine if it fits.

Each client device 218 in client devices 216 comprises an interface 220 that is configured to display an electronic form 222. Electronic form 222 comprises name entry field 224 for a user's name, which might include both first and last name. Electronic form 222 might be, e.g., a tax form or employment application, and typically comprises other data fields in addition to name entry field 224. It is from name entry field 224 that computer system 202 captures the name for which the electronic signature will be created.

Interface 220 also comprises a signature field 226 that allows the user to enter a signature officially affirming information entered into electronic form 222. The signature field 226 might provide the user a single-click entry option for an electronic signature created by computer system 202. Alternatively, if the electronic signature created by computer system 202 is too large for the signature field 226, the signature can provide a manual signature entry option for the user to manually write his or her name in the field.

Electronic signature system 200 might also comprise electronic signature database 232 that is configured to store an electronic signature for future use after it has been created by computer system 202 and accepted and submitted by the user through interface 220. The electronic signatures stored in electronic signature database 232 can be retrieved in and used across different platforms and client devices.

Figure 3:
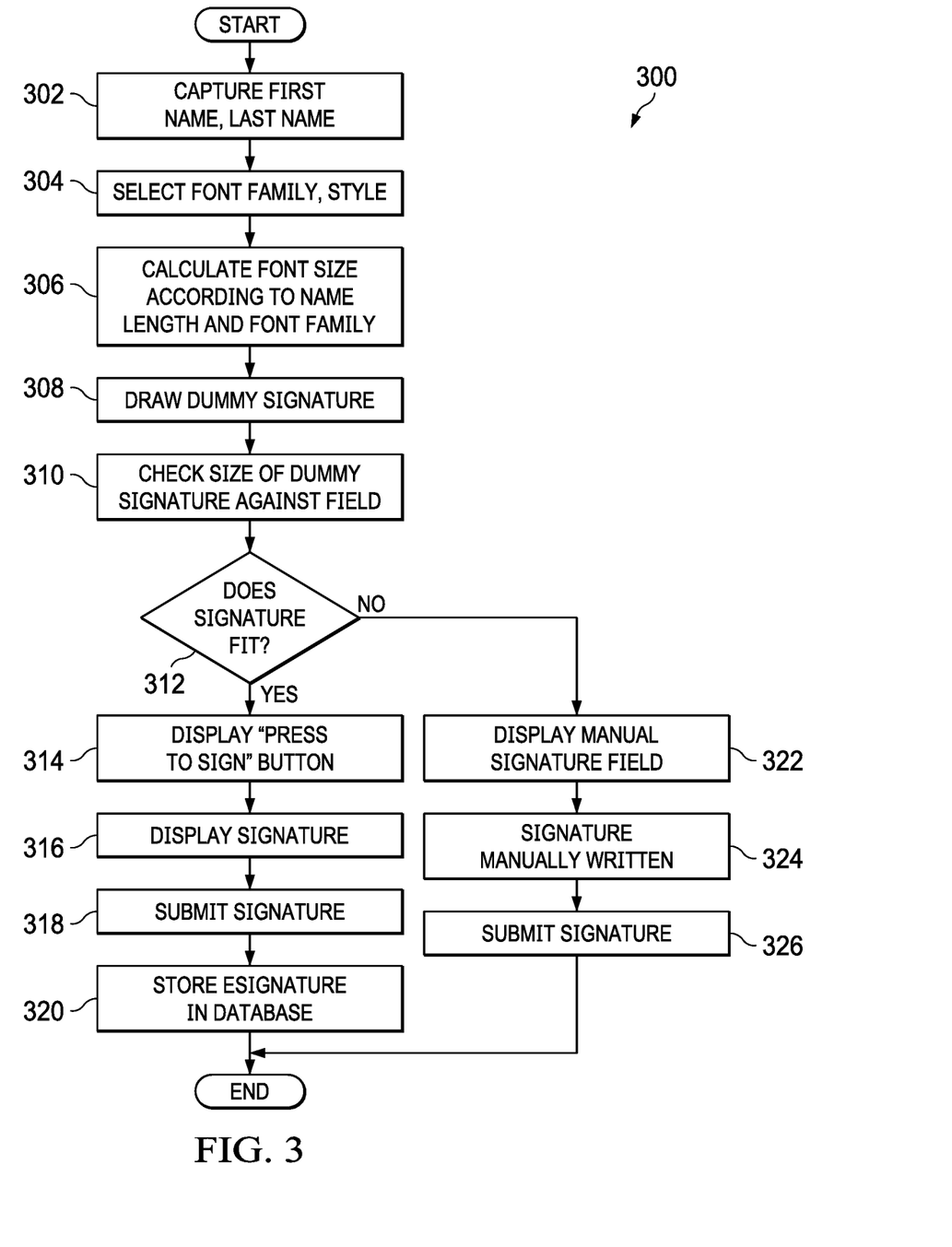
FIG. 3 illustrates a flowchart of a process for electronic signing in accordance with an illustrative embodiment.

FIG. 3 illustrates a flowchart of a process for electronic signing in accordance with an illustrative embodiment. Process 300 might be implemented using electronic signature system 200 shown in FIG. 2. Process 300 begins by capturing a user name through an interface (step 302) (see FIG. 5). The user name might comprise a first name and last name.

A font is selected for creating an electronic signature of the user name (step 304). Selecting the font might comprise selecting a font family and font style that best matches the signature field in question. A font family is a group of letters having similar design styles such as, e.g., Times New Roman, Sans Serif, Courier New, Alex Brush, etc. A font style is the way in which the font is written such as normal, bold, italicized, and/or underlined. The font family and style might be selected by an algorithm such as a round-robin algorithm.

A font size for the electronic signature is then calculated based on the number of characters in the user name (name length) and the selected font (step 306).

The system draws a dummy automated electronic signature of the user name using the selected font and calculated font size (step 308). The electronic signature is checked against a specified signature field in an electronic form (step 310), and a determination is made as to whether the electronic signature fits within the signature field in question (step 312).

Figure 6:
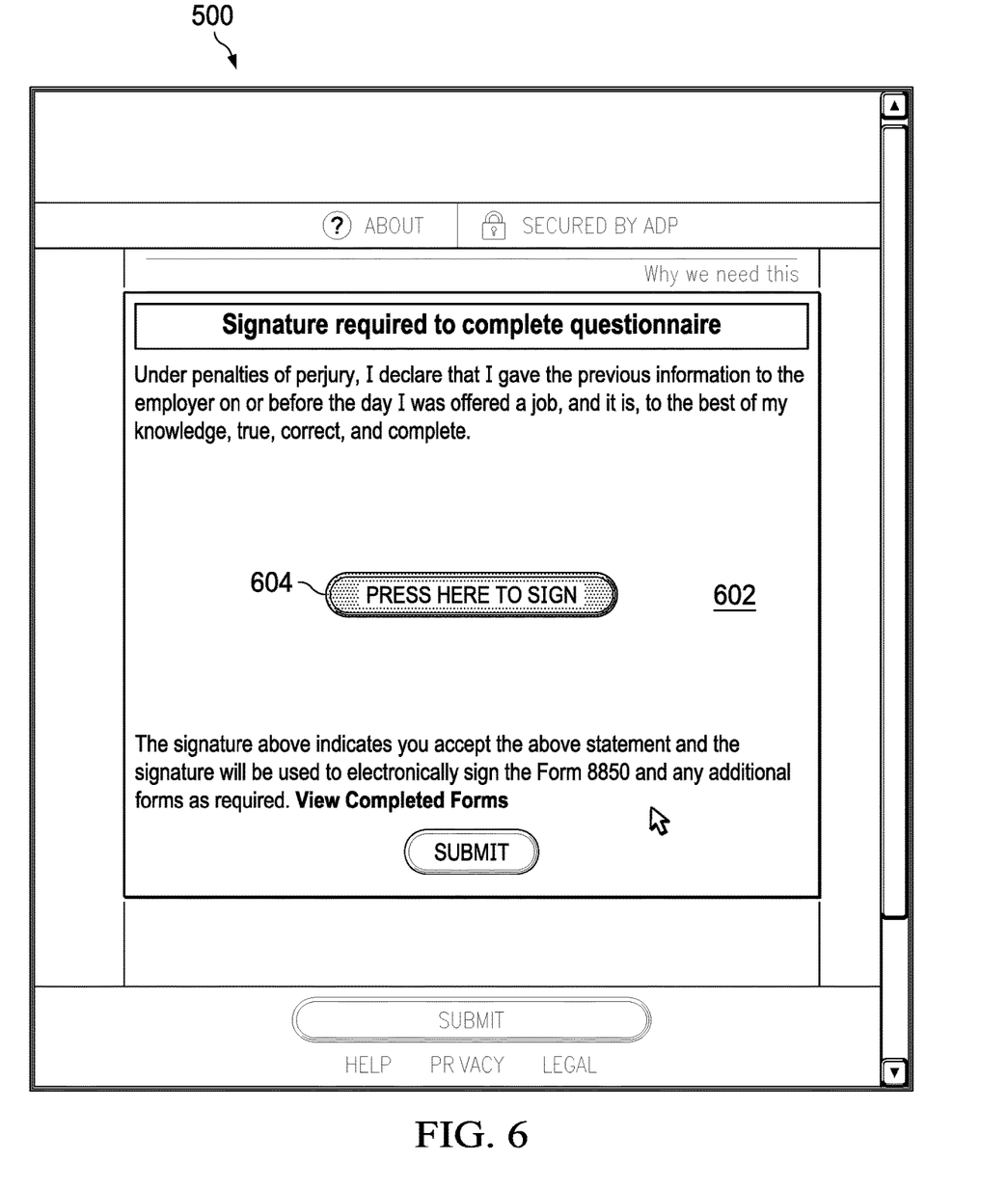
FIG. 6 illustrates a one-click electronic signature field in accordance with an illustrative embodiment.

If the electronic signature fits within the signature field of the form, the system displays a button in the interface providing the user the option to sign with the electronic signature (e.g., "Press here to sign") (step 314) (See FIG. 6). When the user selects the electronic signature option button, the system displays the electronic signature created in step 308 for the user to view before submitting (step 316) (see FIG. 7). The user can then submit the electronic signature in the electronic form with a single click of a submit button in the interface (step 318).

Optionally, the electronic signature might be stored in a database for future use, wherein the electronic signature is accessible by the user for entry into other electronic forms, thereby obviating the need to repeat steps 302-308 (step 320). The process then ends.

Figure 8:
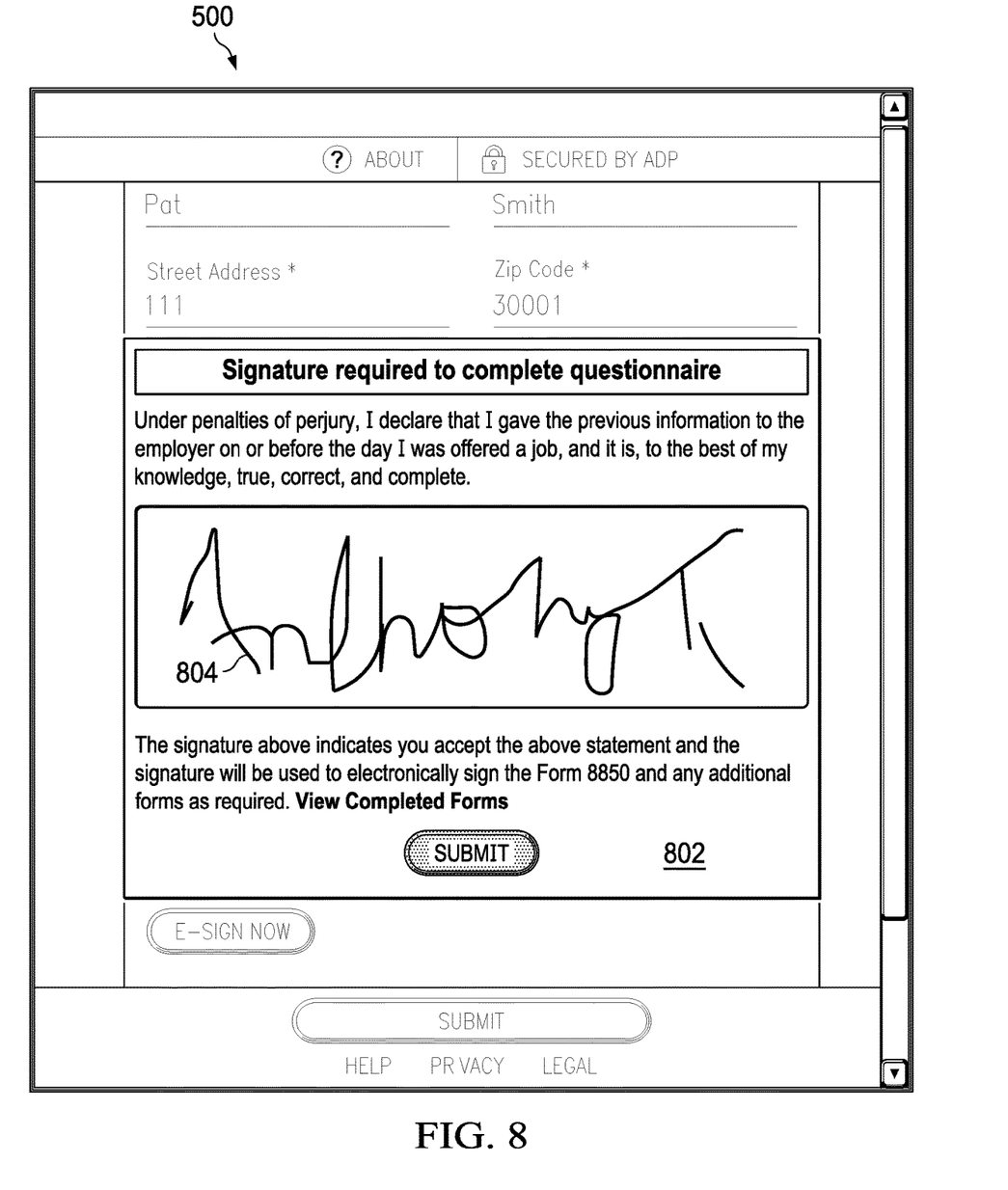
FIG. 8 illustrates a manual signature field in accordance with an illustrative embodiment.

If electronic signature does not fit within the signature of the electronic form the system displays a manual signature entry field in the interface (step 322) (See FIG. 8). The user can manually write his or her name in this entry field (step 324) and submit the signature for entry in the electronic form (step 326). The process then ends.

Figure 4:
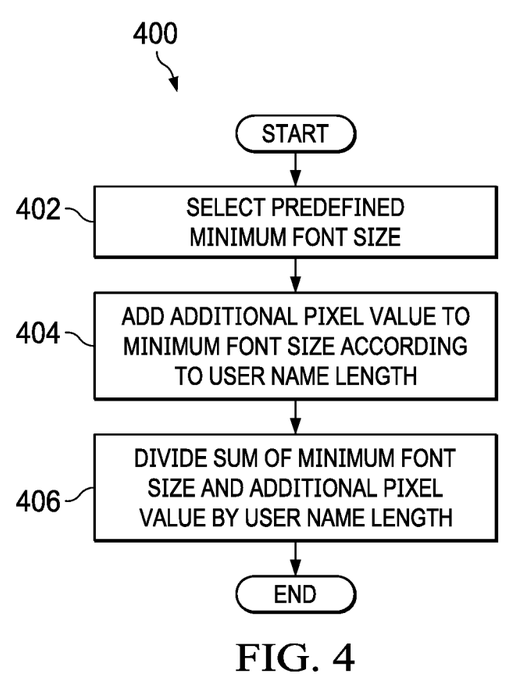
FIG. 4 illustrates a flowchart of a process for calculating the font size of an electronic signature in accordance with an illustrative embodiment.

FIG. 4 illustrates a flowchart of a process for calculating the font size of an electronic signature in accordance with an illustrative embodiment. Process 400 might be a detailed example of step 306 in FIG. 3. Process 400 begins by selecting a predefined minimum font size (step 402). For example, the minimum font size might have a pixel value of 40 px.

An additional pixel value is then added to the minimum font size, wherein the additional pixel value is proportional to the number of characters in the user name (step 404). Furthermore, the additional pixel value might differ according to whether the name is upper case or lower case, wherein the additional pixel value is greater if the user name is lower case than if the name is upper case.

For example, if the name (either first or last name) is equal to or less than eight characters in length, an additional pixel value of 120 px might be added to the minimum font size if the name is upper case. An additional pixel value of 240 px might be added to the minimum font size if the name is lower case.

As another example, if the name is more than eight characters in length, an additional pixel of 160 px might be added to the minimum font size if the name is upper case. An additional pixel value of 320 px to the minimum font size if the name is lower case.

After the additional pixel value has been added to the minimum font size pixel value, the sum is divided by the number of characters in the user name to arrive at the font size for drawing the electronic signature (step 406). Process 400 then ends, and process 300 proceeds to step 308.

Figure 5:
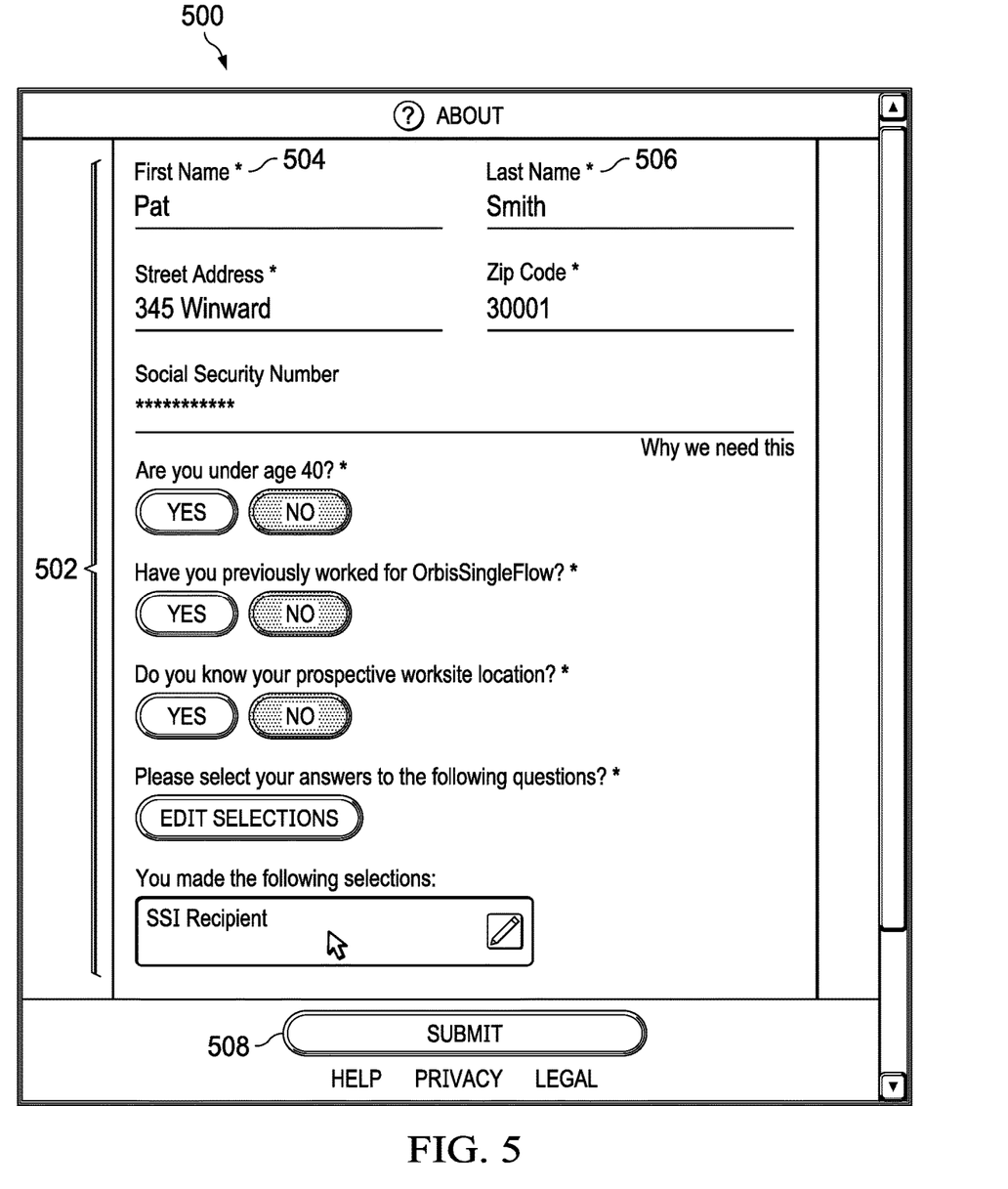
FIG. 5 illustrates an electronic form for entering user information with which the illustrative embodiments can be implemented.

FIG. 5 illustrates an electronic form 500 for entering user information with which the illustrative embodiments can be implemented. Electronic form 500 might be displayed in an interface on a user device such as any of client devices 110 in FIG. 1. Form 500 might be related to, e.g., a service such as banking, tax forms, or an employment application.

Form 500 comprises a number of data entry fields 502, which include a first name entry field 504 and a last name entry field 506. The first name entry field 504 and last name entry field 506 allow the electronic signature system to capture the user name in step 302 of process 300. When the user has completed entering the information, the user can click a submit button 508 to submit the information to the service or party providing form 500.

When in the information in form 500 is submitted, the electronic signature system (e.g., electronic signature system 200) automatically performs in the background steps 302-312 of process 300 to determine if an electronic signature can be drawn to fit within a signature field provided in connection with form 500.

FIG. 6 illustrates a one-click electronic signature field in accordance with an illustrative embodiment. User information often requires affirmation via a user signature for legal purposes. If the electronic signature automatically generated from name fields 504, 506 can fit within the signature field in question, as determined in steps 302-312 of process 300, the signature field 602 is displayed in the interface as a pop-up window that provides the user with a one-click option button (e.g., "Press Here to Sign") 604 to sign electronically with a single click. Alternatively, the signature field 602 might be provided as a separate form or web page (not shown) instead of a pop-up window over form 500.

Figure 7:
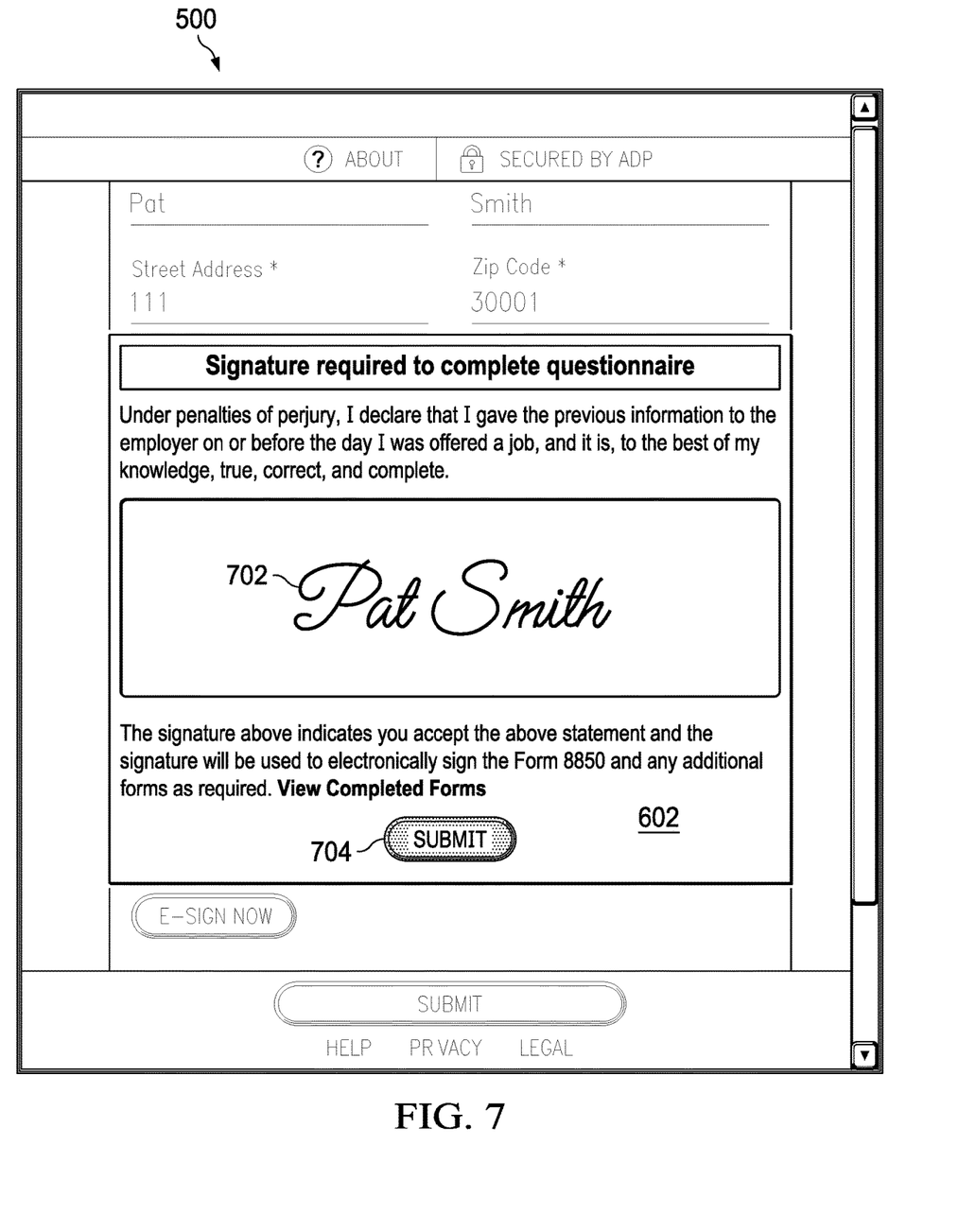
FIG. 7 illustrates a signature field with an electronic signature in accordance with an illustrative embodiment.

FIG. 7 illustrates a signature field with an electronic signature in accordance with an illustrative embodiment. After the user selects the one-click signature button 604 in signature field 602, the electronic signature system populates the signature field 602 with the electronic signature 702 created in step 308 of process 300. When the signature field 602 is filled, the submit button 704 becomes active, allowing the user to submit the electronic signature to affirm the information entered in form 500.

FIG. 8 illustrates a manual signature field in accordance with an illustrative embodiment. If step 312 in process 300 determines that the automatically generated electronic signature drawn in step 308 will not fit within the signature field, the electronic signature system displays a manual entry signature field 802 in which the user can draw a signature 804 using, e.g., a mouse, stylus, finger, etc.

Figure 9:
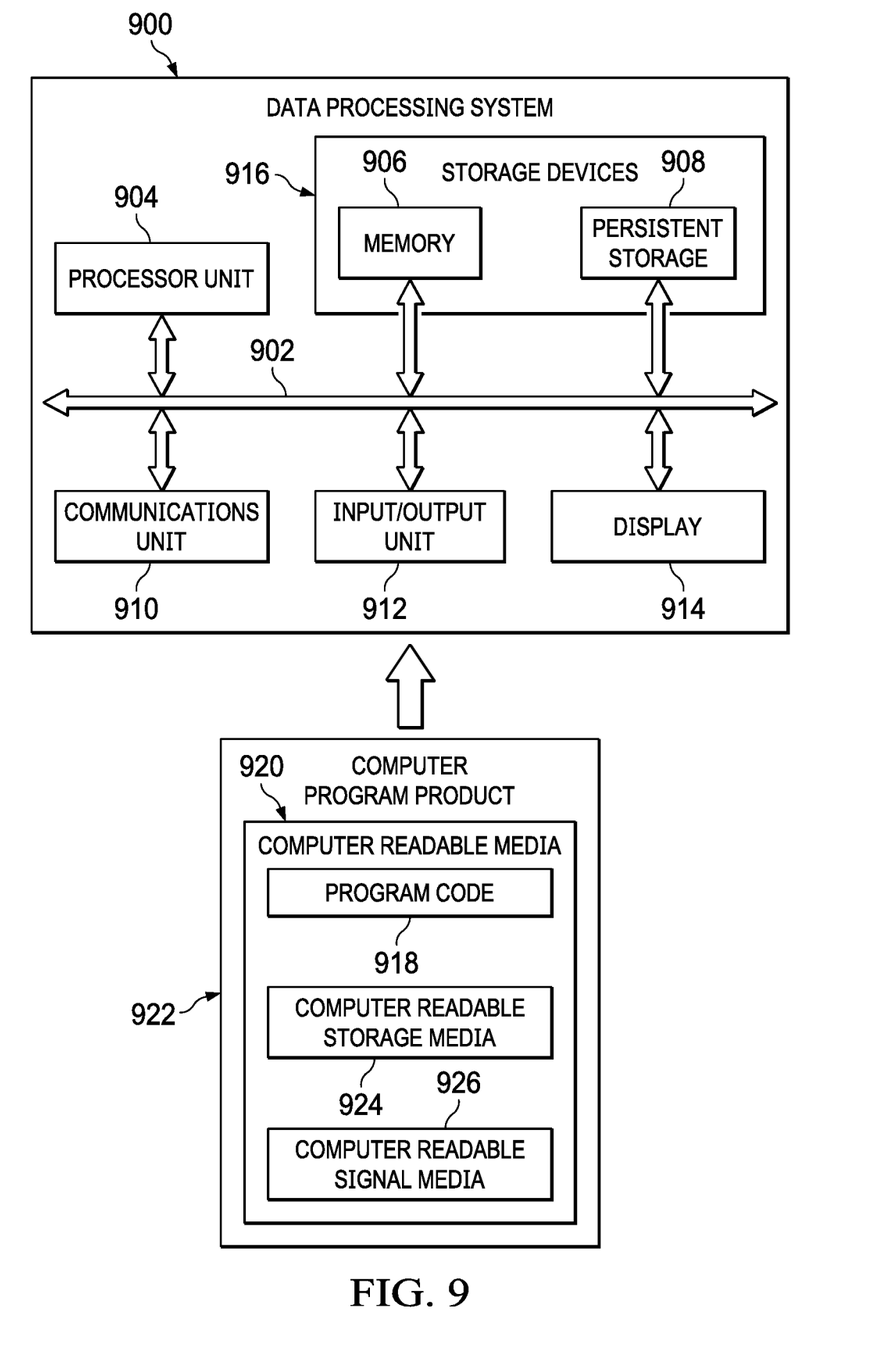
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement one or more computers, including server computers 104, 106 and client devices 110 in FIG. 1. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (CPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 916, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-method for electronic signature, the method comprising:
   using a number of processors to perform the steps of:
   capturing a user name through an interface;
   calculating a font size for an electronic signature of the user name based on the number of characters in the user name;
   drawing the electronic signature of the user name using the calculated font size;
   determining if the electronic signature fits within a specified field of an electronic form; and
   submitting the electronic signature in the electronic form if the electronic signature fits within the specified field.

2. The method claim 1, wherein calculating the font size further comprises:
   selecting a predefined font size;
   adding an additional pixel value to the predefined font size, wherein the additional pixel value is proportional to the number of characters in the user name; and
   dividing the sum of the predefined font size and additional pixel value by the number of characters in the user name.

3. The method of claim 2, wherein the additional pixel value is greater if the user name is lower case rather than upper case.

4. The method of claim 1, further comprising:
   if the electronic signature does not fit within the specified field, displaying a manual signature entry field in the interface.

5. The method of claim 1, wherein the user name comprises a first name and last name.

6. The method of claim 1, further comprising selecting a font family and font style.

7. The method of claim 1, wherein the electronic signature can be submitted in the electronic form by the user with a single click in the interface.

8. The method of claim 1, further comprising displaying the electronic signature to the user in the interface before submitting the electronic signature in the electronic form.

9. The method of claim 1, further comprising storing the electronic signature in a database, wherein the electronic signature is accessible by the user for entry into other electronic forms.

10. A system for electronic signature, the system comprising:
    a storage device configured to store program instructions; and
    one or more processors operably connected to the storage device and configured to execute the program instructions to cause the system to:
    capture a user name through an interface;
    calculate a font size for an electronic signature of the user name based on the number of characters in the user name;
    draw the electronic signature of the user name using the calculated font size;
    determine if the electronic signature fits within a specified field of an electronic form; and
    submit the electronic signature in the electronic form if the electronic signature fits within the specified field.

11. The system of claim 10, wherein calculating the font size further comprises:
    selecting a predefined font size;
    adding an additional pixel value to the predefined font size, wherein the additional pixel value is proportional to the number of characters in the user name; and
    dividing the sum of the predefined font size and additional pixel value by the number of characters in the user name.

12. The system of claim 11, wherein the additional pixel value is greater if the user name is lower case rather than upper case.

13. The system of claim 10, wherein, if the electronic signature does not fit within the specified field, the processors further execute instructions to display a manual signature entry field in the interface.

14. The system of claim 10, wherein the user name comprises a first name and last name.

15. The system of claim 10, further comprising selecting a font family and font style.

16. The system of claim 10, wherein the electronic signature can be submitted in the electronic form by the user with a single click in the interface.

17. The system of claim 10, wherein the processors further execute instructions to display the electronic signature to the user in the interface before submitting the electronic signature in the electronic form.

18. The system of claim 10, wherein the processors further execute instructions to store the electronic signature in a database, wherein the electronic signature is accessible by the user for entry into other electronic forms.

19. A computer program product for electronic signature, the computer program product comprising:
    a computer readable storage media having program instructions stored thereon to perform the steps of:
    capturing a user name through an interface;
    calculating a font size for an electronic signature of the user name based on the number of characters in the user name;
    drawing the electronic signature of the user name using the calculated font size;
    determining if the electronic signature fits within a specified field of an electronic form; and
    submitting the electronic signature in the electronic form if the electronic signature fits within the specified field.

20. The computer program product of claim 19, wherein calculating the font size further comprises:
    selecting a predefined font size;
    adding an additional pixel value to the predefined font size, wherein the additional pixel value is proportional to the number of characters in the user name; and
    dividing the sum of the predefined font size and additional pixel value by the number of characters in the user name.

* * * * *